United States Patent
Izawa

(10) Patent No.: US 9,247,227 B2
(45) Date of Patent: Jan. 26, 2016

(54) CORRECTION OF THE STEREOSCOPIC EFFECT OF MULTIPLE IMAGES FOR STEREOSCOPE VIEW

(71) Applicant: FUJIFILM Corporation, Tokyo (JP)

(72) Inventor: Katsutoshi Izawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 10 days.

(21) Appl. No.: 14/218,379

(22) Filed: Mar. 18, 2014

(65) Prior Publication Data

US 2014/0198188 A1 Jul. 17, 2014

Related U.S. Application Data

(63) Continuation of application No. PCT/JP2012/067787, filed on Jul. 12, 2012.

(30) Foreign Application Priority Data

Sep. 21, 2011 (JP) ................................ 2011-206320

(51) Int. Cl.
*H04N 13/00* (2006.01)
*H04N 13/02* (2006.01)

(52) U.S. Cl.
CPC ....... *H04N 13/0007* (2013.01); *H04N 13/0022* (2013.01); *H04N 13/0207* (2013.01); *H04N 13/0225* (2013.01); *H04N 2013/0081* (2013.01)

(58) Field of Classification Search
USPC .......................................................... 348/49
See application file for complete search history.

(56) References Cited

U.S. PATENT DOCUMENTS

| 5,319,417 A * | 6/1994 | Hahm et al. ................... 355/22 |
| 6,163,337 A * | 12/2000 | Azuma et al. .................. 348/43 |
| 2010/0039504 A1 | 2/2010 | Takahashi et al. |
| 2012/0033957 A1 * | 2/2012 | Itoh .............................. 396/111 |

FOREIGN PATENT DOCUMENTS

| CN | 101312539 A | 11/2008 |
| JP | 11-146423 A | 5/1999 |
| JP | 2008-67521 A | 3/2006 |
| JP | 2009-251839 A | 10/2009 |
| JP | 2010-45584 A | 2/2010 |
| JP | 2010-206774 A | 9/2010 |
| WO | WO 2010/090150 A1 | 8/2010 |
| WO | WO 2011/028547 A2 | 3/2011 |

OTHER PUBLICATIONS

Chinese Office Action and Search Report, mailed Sep. 22, 2014, for Chinese Application No. 201280046323.3 with English translation.
European Search Report, dated Mar. 15, 2015, in related application No. EP12833197.
Arai et al., "Optimization of Correlation Function and Sub-Pixel Estimation Method on Block Matching", Information Processing Society of Japan SIG Technical Report, CVIM-144, vol. 2004, No. 40, 2004, pp. 33-40.

* cited by examiner

*Primary Examiner* — Gelek W Topgyal
*Assistant Examiner* — Leron Beck
(74) *Attorney, Agent, or Firm* — Birch, Stewart, Kolasch & Birch, LLP

(57) ABSTRACT

An image processing method includes: acquiring a first image and second image with a parallax, calculating a parallax indicating a shift amount of a corresponding pixel of the second image with respect to each pixel of the first image, deciding an image processing coefficient to perform edge emphasis or edge correction based on the parallax with respect to every image processing target pixel of the first image and the second image, and performing image processing on the first image and the second image using the image processing coefficient.

9 Claims, 15 Drawing Sheets

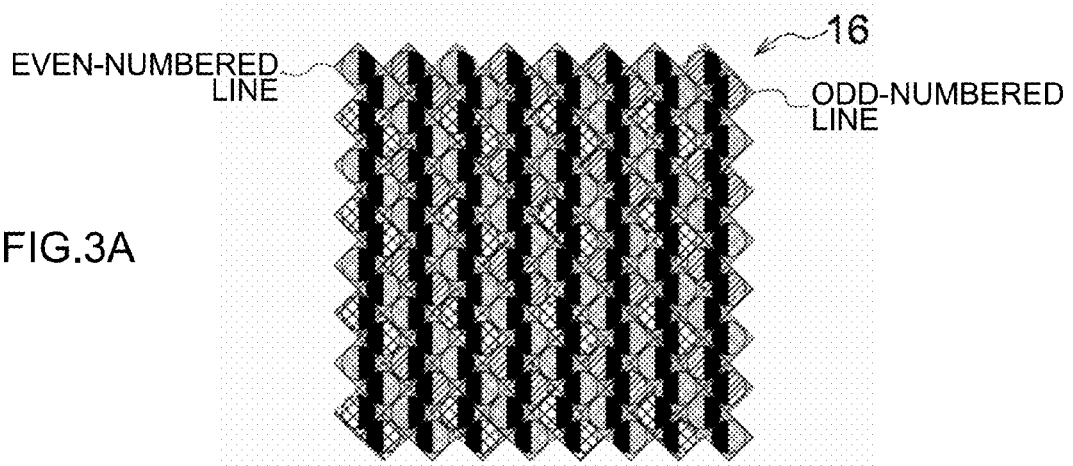
FIG.3A
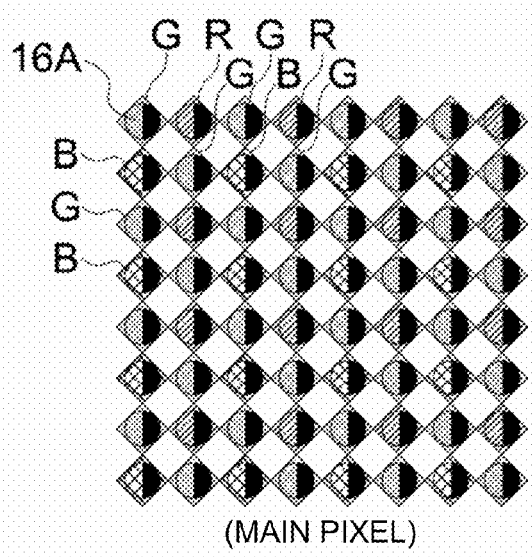
FIG.3B (MAIN PIXEL)
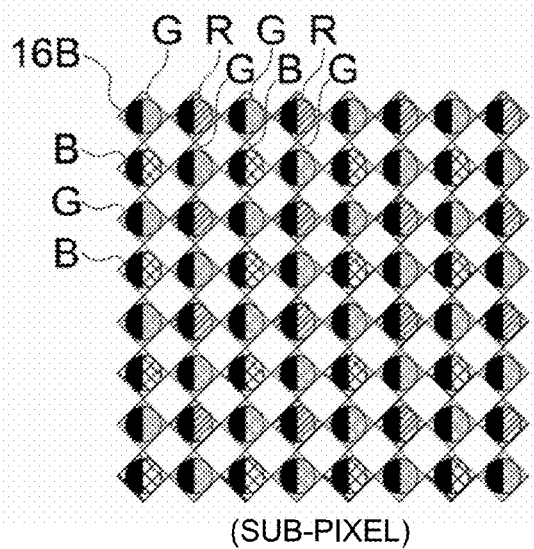
FIG.3C (SUB-PIXEL)

FIG.6A   FILTER $F_L$ APPLIED TO LEFT-EYE IMAGE

| -0.25 | -0.25 | 2 | -0.25 | -0.25 | 0 | 0 |

FIG.6B   FILTER $F_R$ APPLIED TO RIGHT-EYE IMAGE

| 0 | 0 | -0.25 | -0.25 | 2 | -0.25 | -0.25 |

(EXAMPLE OF PROCESSING)

— :PHASE SHIFT AMOUNT OF LEFT-EYE IMAGE
---- :PHASE SHIFT AMOUNT OF RIGHT-EYE IMAGE

FIG.11A

|   |   |   |   |   |   |   |
|---|---|---|---|---|---|---|
| 0 | 0 | 0 | 0 | 0 | 0 | 0 |
| 0 | 0 | -1 | -1 | -1 | -1 | -1 |
| 0 | 0 | -1 | -1 | -1 | -1 | -1 |
| 0 | 0 | -1 | -1 | 25 | -1 | -1 |
| 0 | 0 | -1 | -1 | -1 | -1 | -1 |
| 0 | 0 | -1 | -1 | -1 | -1 | -1 |
| 0 | 0 | 0 | 0 | 0 | 0 | 0 |

(FILTER $F_L$)

FIG.11B

|   |   |   |   |   |   |   |
|---|---|---|---|---|---|---|
| 0 | 0 | 0 | 0 | 0 | 0 | 0 |
| -1 | -1 | -1 | -1 | -1 | 0 | 0 |
| -1 | -1 | -1 | -1 | -1 | 0 | 0 |
| -1 | -1 | 25 | -1 | -1 | 0 | 0 |
| -1 | -1 | -1 | -1 | -1 | 0 | 0 |
| -1 | -1 | -1 | -1 | -1 | 0 | 0 |
| 0 | 0 | 0 | 0 | 0 | 0 | 0 |

(FILTER $F_R$)

— :PHASE SHIFT AMOUNT OF LEFT-EYE IMAGE
---- :PHASE SHIFT AMOUNT OF RIGHT-EYE IMAGE

—— :PHASE SHIFT AMOUNT OF LEFT-EYE IMAGE
---- :PHASE SHIFT AMOUNT OF RIGHT-EYE IMAGE

— :PHASE SHIFT AMOUNT OF LEFT-EYE IMAGE
---- :PHASE SHIFT AMOUNT OF RIGHT-EYE IMAGE

CORRECTION OF THE STEREOSCOPIC EFFECT OF MULTIPLE IMAGES FOR STEREOSCOPE VIEW

CROSS REFERENCE TO RELATED APPLICATIONS

This non-provisional application is a Continuation of International Application No. PCT/JP2012/067787 filed on Jul. 12, 2012, which claims the benefit of Japanese Patent Application No. 2011-206320 filed in Japan on Sep. 21, 2011. The entire contents of all of the above applications are hereby incorporated by reference.

BACKGROUND OF THE INVENTION

1. Field of the Invention

The presently disclosed subject matter relates to an image processing device, method, program and recording medium, a stereoscopic image capture device, a portable electronic apparatus, a printer and a stereoscopic image player device. Specifically, the presently disclosed subject matter relates to a technique of correcting the stereoscopic effect of multiple images for stereoscopic view.

2. Description of the Related Art

Conventionally, a range of a depth amount expressed by pop-up and pop-down of a stereoscopic image is called a dynamic range. There is suggested a stereoscopic image correction device that corrects at least one of the pop-up amount and pop-down amount of the dynamic range (Japanese Patent Application Laid-Open No. 2010-045584).

This stereoscopic image correction device corrects a pixel shift amount of a binocular parallax image according to a distance to an object perceived by a viewer (visual distance).

In the image signal processing circuit described in Japanese Patent Application Laid-Open No. 2009-251839, in order to solve a problem of causing decrease in stereoscopic effect or perspective sense in a high-resolution image, depth information is estimated from a blur amount to change a degree of edge emphasis and a degree of smoothing. By this means, it is possible to achieve both high resolution of images and the stereoscopic effect or perspective sense.

The image processing device described in Japanese Patent Application Laid-Open No. 2006-067521 divides a predetermined region of one screen of taken image data into a plurality of regions and classifies a anteroposterior relation of objects in the regions into groups. Further, by applying filters with different frequency characteristics according to the groups, an image of the object in a distance in a designated range adopts a high-pass filter (HPF) to emphasize the image in units of each region or adopts a low-pass filter (LPF) to blur the image. By this means, it is possible to generate an image with the stereoscopic effect.

SUMMARY OF THE INVENTION

The invention described in Japanese Patent Application Laid-Open No. 2010-045584 corrects the pop-up amount or pop-down amount of a stereoscopic image by correcting the pixel shift amount of a binocular parallax image. In the invention described in Japanese Patent Application Laid-Open No. 2010-045584, there is a problem that a stereoscopic image after parallax correction fails if there is an error in the parallax measurement of the pixel shift amount of a binocular parallax image.

The invention described in Japanese Patent Application Laid-Open No. 2009-251839 estimates depth information from the blur amount or the like and changes the edge emphasis level. However, in the invention described in Japanese Patent Application Laid-Open No. 2009-251839, the parallax is not directly changed using the parallaxes of right and left images, and the correction of the stereoscopic effect is limited.

The invention described in Japanese Patent Application Laid-Open No. 2006-067521 applies processing that gives the stereoscopic effect to a planar image, and does not correct the parallax.

The presently disclosed subject matter is made in view of such a condition, and it is an object to provide an image processing device, method, program and recording medium, a stereoscopic image capture device, a portable electronic apparatus, a printer and a stereoscopic image player device that can perform natural parallax correction on a plurality of images for stereoscopic view and perform parallax correction with less failure even in a case where it is not possible to perform parallax correction accurately.

To achieve the object, an image processing device according to one aspect of the presently disclosed subject matter includes: an image acquisition unit configured to acquire a first image and a second image with a parallax, which are taken as a stereoscopic image; a parallax calculation unit configured to calculate a parallax indicating a shift amount of a corresponding pixel of the second image with respect to each pixel of the first image acquired by the image acquisition unit; an image processing coefficient decision unit configured to decide an image processing coefficient to perform edge emphasis or edge correction with respect to every image processing target pixel of the first image and the second image acquired by the image acquisition unit, and decide the image processing coefficient for the target pixel based on the parallax calculated by the parallax calculation unit; and an image processing unit configured to perform image processing using the image processing coefficient decided by the image processing coefficient decision unit for the first image and the second image acquired by the image acquisition unit.

According to one aspect of the presently disclosed subject matter, the image processing is performed on the first image and the second image that are taken as a stereoscopic image, by applying an image processing coefficient for edge emphasis or edge correction that can perform parallax correction according to the original parallax of a target pixel every image processing target pixel. By this means, it is possible to perform natural parallax correction and edge emphasis or edge correction at the same time. Moreover, a part in which the parallax cannot be accurately detected is a flat part in many cases, and there is no contoured part subjected to edge emphasis or edge correction in the flat part. Therefore, even if the phase of edge emphasis or edge correction shifts, it is less likely to lead to failure. Also, in the above-mentioned aspect, the edge emphasis or the edge correction means formation processing of the edge part.

In the image processing device according to another aspect of the presently disclosed subject matter, the image processing coefficient decision unit decides the image processing coefficient such that a center of the image processing coefficient for the edge emphasis or the edge correction shifts from a center of a computation target pixel. By performing the image processing on the target pixel by this image processing coefficient, it is possible to shift the parallax (phase) and perform edge emphasis or edge correction.

In the image processing device according to another aspect of the presently disclosed subject matter, the image processing coefficient decision unit shifts the center of the image processing coefficient from the center of the computation target pixel according to a shift direction of the parallax.

In the image processing device according to another aspect of the presently disclosed subject matter, the image processing coefficient decision unit decides a filter coefficient as the image processing coefficient, and the image processing unit performs filter processing by a filter using the filter coefficient.

As the filter, it is possible to use a one-dimensional filter or a two-dimensional filter. In the case of the one-dimensional filter, it is preferable to additionally perform edge emphasis or edge correction by another one-dimensional filter that performs edge emphasis or edge correction in the direction orthogonal to the parallax direction. On the other hand, it is not necessary in the case of the two-dimensional filter.

In the image processing device according to another aspect of the presently disclosed subject matter, it is preferable that the image processing coefficient decision unit decides a filter coefficient in which at least one of the degree of the edge emphasis or the edge correction and a frequency band varies according to the parallax.

In the image processing device according to another aspect of the presently disclosed subject matter, it is preferable that the image processing coefficient decision unit decides at least one of a filter coefficient that reduces the degree of the edge emphasis or the edge correction as the parallax increases and a filter coefficient that widens the frequency band as the parallax increases. If excessive edge emphasis or edge correction is performed on a blur part with a large parallax, it can lead to an increase in noise. Therefore, it is preferable to change the degree of edge emphasis or edge correction or a frequency band according to the parallax correction amount (parallax level).

In the image processing device according to another aspect of the presently disclosed subject matter, when the parallax calculated by the parallax calculation unit is input for the target pixel, the image processing coefficient decision unit calculates a parallax shift amount according to a predetermined function for parallax correction or reads out a corresponding parallax shift amount from a predetermined look-up table for parallax correction, and shifts the center of the image processing coefficient from the center of the computation target pixel according to the calculated or read parallax shift amount.

The image processing device according to another aspect of the presently disclosed subject matter is preferable to further include a selection unit including a plurality of the predetermined functions or look-up tables for parallax correction, the selection unit configured to select any function or look-up table from the plurality of functions or the look-up tables by a user setting. By this means, it is possible to perform parallax emphasis or parallax reduction by user's preference.

In the image processing device according to another aspect of the presently disclosed subject matter, the parallax calculation unit detects a pixel on the second image corresponding to the target pixel of the first image by block matching between an image of a predetermined block size based on the target pixel of the first image and the second image, and calculates a parallax between the target pixel of the first image and the detected pixel on the second image.

In the image processing device according to another aspect of the presently disclosed subject matter, it is preferable that: the parallax calculation unit holds images of the block size in the first image and the second image used at the parallax detection; the image processing unit has a computation target pixel range of a same size as the predetermined block size; and the image processing unit performs image processing using the images of the predetermined block size of the first image and the second image held by the parallax calculation unit and the image processing coefficient of the computation target pixel range.

The image of the predetermined block size in the first image and the second image used for the parallax detection is held without being released and may be used for image processing in the image processing unit. Therefore, it is possible to reduce the memory utilization and speed-up the processing.

In the image processing device according to another aspect of the presently disclosed subject matter, it is preferable that the first image and the second image are color images of three primary colors and the image processing unit performs image processing using an identical image processing coefficient for each of color signals indicating the color images of three primary colors. By this means, it is possible to cause an image after parallax correction not to be subjected to color shift.

In the image processing device according to another aspect of the presently disclosed subject matter, it is preferable that the first image and the second image are color images of three primary colors and the image processing unit performs image processing using an identical image processing coefficient for a luminance signal and a color-difference signal that are generated from the color images of the three primary colors. Although usual edge emphasis or edge correction is performed only on the luminance signal, the phase shift is caused with the edge emphasis or the edge correction in the presently disclosed subject matter. Therefore, image processing is performed even on the color-difference signal by the use of the identical image processing coefficient so as not to cause color shift.

An image processing method according to another aspect of the presently disclosed subject matter includes: an image acquisition step of acquiring a first image and a second image with a parallax, which are taken as a stereoscopic image; a parallax calculation step of calculating a parallax indicating a shift amount of a corresponding pixel of the second image with respect to each pixel of the first image acquired in the image acquisition step; an image processing coefficient decision step of deciding an image processing coefficient to perform edge emphasis or edge correction with respect to very image processing target pixel of the first image and the second image acquired in the image acquisition step, and deciding the image processing coefficient for the target pixel based on the parallax calculated in the parallax calculation step; and an image processing step of performing image processing using the image processing coefficient decided in the image processing coefficient decision step for the first image and the second image acquired in the image acquisition step.

An image processing program according to another aspect of the presently disclosed subject matter causes a computer to execute: an image acquisition function that acquires a first image and a second image with a parallax, which are taken as a stereoscopic image; a parallax calculation function that calculates a parallax indicating a shift amount of a corresponding pixel of the second image with respect to each pixel of the first image acquired by the image acquisition function; an image processing coefficient decision function that decides an image processing coefficient to perform edge emphasis or edge correction with respect to every image processing target pixel of the first image and the second image acquired by the image acquisition function, and decides the image processing coefficient for the target pixel based on the parallax calculated by the parallax calculation function; and an image processing function that performs image processing using the image processing coefficient decided by the image processing coefficient decision function for the first image and the second image acquired by the image acquisition function.

A stereoscopic image capture device according to another aspect of the presently disclosed subject matter includes: a single imaging optical system; and an imaging element in which object images passing through different regions of the imaging optical system are subjected to pupil division and formed, the imaging element configured to acquire a first image and a second image with different parallaxes by performing photoelectric conversion on the object images passing through the different regions; and any of the above-mentioned image processing devices.

Since the base length is short in a stereoscopic image capture device including a single imaging optical system and an imaging element that can acquire a phase difference image, although an image with a small stereoscopic effect (parallax) is provided in many cases, it is possible to emphasize the stereoscopic effect by the presently disclosed subject matter.

In a stereoscopic image capture device according to another aspect of the presently disclosed subject matter, the imaging element includes a first group pixel and a second group pixel for photoelectric conversion, which are arranged in a matrix manner in a substantially entire surface of an exposure region of the imaging element, the first group pixel being restricted in a light receiving direction of a light flux so as to receive light of only an object image passing through a first region of the imaging optical system, and the second group image being restricted in a light receiving direction of a light flux so as to receive light of only an object image passing through a second region of the imaging optical system, and the imaging element can read out the first image and the second image from the first group pixel and the second group pixel. By this means, it is possible to acquire a plurality of images with different parallaxes at the same time by one imaging element, and the device is not enlarged.

A portable electronic apparatus according to another aspect of the presently disclosed subject matter includes the above-mentioned stereoscopic image processing device. The portable electronic apparatus includes a camera phone, a personal digital assistant (PDA) and a portable game device.

A printer according to another aspect of the presently disclosed subject matter includes: any of the above-mentioned image processing devices; and a print unit configured to create a photographic print for stereoscopic view based on the first image and the second image processed by the image processing device.

A stereoscopic image player device according to another aspect of the presently disclosed subject matter includes: any of the above-mentioned image processing devices; and an image display unit configured to display an image for stereoscopic view based on the first image and the second image processed by the image processing device.

According to the presently disclosed subject matter, image processing is performed on the first image and the second image taken as a stereoscopic image by applying an image processing coefficient to perform edge emphasis or edge correction that can perform parallax correction according to the original parallax of a target pixel every image processing target pixel. Therefore, it is possible to perform natural parallax correction and edge emphasis or edge correction at the same time. Here, a part in which the parallax cannot be accurately detected is a flat part in many cases, and there is no contoured part subjected to edge emphasis or edge correction in the flat part. Therefore, even if the phase of edge emphasis or edge correction shifts, it is less likely to lead to failure, and it is possible to perform parallax correction with less failure.

BRIEF DESCRIPTION OF THE DRAWINGS

FIG. 3A is a plan view illustrating a configuration example of an imaging element of a stereoscopic image capture device;

FIG. 3B is a plan view illustrating a configuration example of the imaging element (main pixel) of the stereoscopic image capture device;

FIG. 3C is a plan view illustrating a configuration example of the imaging element (sub-pixel) of the stereoscopic image capture device;

FIG. 6A is a view illustrating a filter applied to a left-eye image;

FIG. 6B is a view illustrating a filter applied to a right-eye image;

FIG. 11A is a view illustrating an example of a two-dimensional filter (for the left eye);

FIG. 11B is a view illustrating an example of a two-dimensional filter (for the right eye);

DETAILED DESCRIPTION OF EXEMPLARY EMBODIMENTS

In the following, embodiments of an image processing device, method, program and recording medium, a stereoscopic image capture device, a portable electronic apparatus, a printer and a stereoscopic image player device according to the presently disclosed subject matter are described according to the accompanying drawings.

[Entire Structure of Stereoscopic Image Capture Device]

Figure 1:
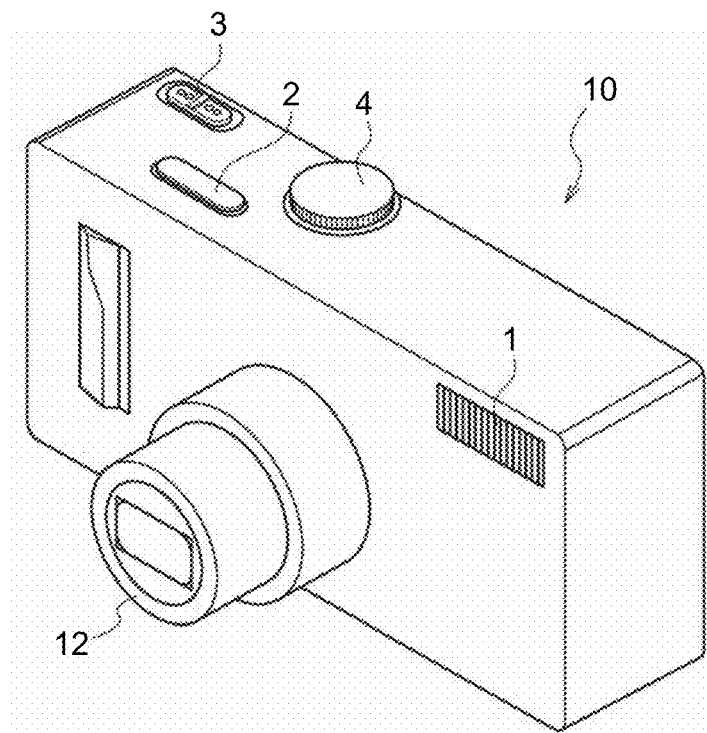
FIG. 1 is a front perspective view illustrating an embodiment of a stereoscopic image capture device to which an image processing device according to the presently disclosed subject matter is applied.
Figure 2:
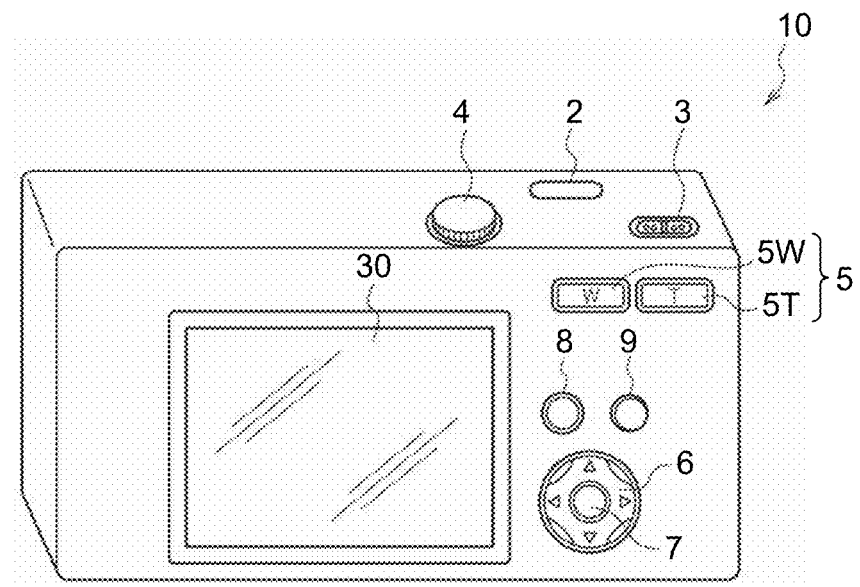
FIG. 2 is a back perspective view of the above-mentioned stereoscopic image capture device.

FIG. 1 is a front perspective view illustrating an embodiment of a stereoscopic image capture device to which an image processing device according to the presently disclosed subject matter is applied. FIG. 2 is a back perspective view of the above-mentioned stereoscopic image capture device. This stereoscopic image capture device 10 is a digital camera that receives the light passing through a lens by an imaging element, converts it into a digital signal and records it in a recording medium such as a memory card.

As illustrated in FIG. 1, an imaging lens 12 and a flash light emitting unit 1, and so on, are arranged on a front side of a stereoscopic image capture device 10. On an upper surface of the stereoscopic image capture device 10, a shutter button 2, a power/mode switch 3 and a mode dial 4, and so on, are arranged. Meanwhile, as illustrated in FIG. 2, a 3D liquid crystal monitor 30 for 3D display, a zoom button 5, a cross button 6, a MENU/OK button 7, a playback button 8 and a BACK button 9, and so on, are arranged in a back of the stereoscopic image capture device 10.

The imaging lens 12 is formed with a collapsible zoom lens. When the mode of the camera is set to an imaging mode by the power/mode switch 3, it is drawn out from the main body (camera body) of the stereoscopic image capture device 10. The flash light emitting unit 1 irradiates the flashlight toward an object.

The shutter button 2 is formed with a two-stage stroke type switch of so-called "half press" and "full press". If this shutter button 2 is "pressed halfway" when the stereoscopic image capture device 10 operates in the imaging mode, automatic exposure adjustment (AE)/automatic focus adjustment (AF) operates. Moreover, if this shutter button 2 is "pressed fully" when the stereoscopic image capture device 10 operates in the imaging mode, imaging is performed.

The power/mode switch 3 has a function as a power source switch to turn on/off the power source of the stereoscopic image capture device 10 and a function as a mode switch to set the mode of the stereoscopic image capture device 10. The power/mode switch 3 is slidably arranged between "OFF position", "playback position" and "imaging position". The stereoscopic image capture device 10 is powered on by sliding and adjusting the power/mode switch 3 to "playback position" or "imaging position", and is powered off by adjusting it to "OFF position". Further, it is set to "playback mode" by sliding and adjusting the power/mode switch 3 to "playback position", and it is set to "imaging mode" by adjusting it to "imaging position".

The mode dial 4 functions as imaging mode setting means that set the imaging mode of the stereoscopic image capture device 10. The imaging mode of the stereoscopic image capture device 10 is set to various modes by the setting position of this mode dial 4. For example, there are "plane image imaging mode" to take a plane image, "stereoscopic image imaging mode" to take a stereoscopic image (3D image) and "moving image imaging mode" to take a moving image, and so on.

The 3D liquid crystal monitor 30 is stereoscopic display means for being able to display stereoscopic images (left-eye image and right-eye image) as directivity images with respective predetermined directivities by a parallax barrier. In a case where the stereoscopic images are input in the 3D liquid crystal monitor 30, the parallax barrier formed in a pattern in which a light transmission unit and a light shielding unit are alternately arranged at a predetermined pitch, is caused on a parallax barrier display layer of the 3D liquid crystal monitor 30. Reed-shaped image fragments indicating the right and left images are alternately arranged on the image display surface of a lower layer of the parallax barrier display layer. In a case where it is used as a plane image or a user interface display panel, nothing is displayed on the parallax barrier display layer, and one image is displayed on the image display surface of the lower layer as it is. Also, the mode of the 3D liquid crystal monitor 30 is not limited to this, and it only has to display the left-eye image and the right-eye image as stereoscopic images in a recognizable manner. For example, the mode of the 3D liquid crystal monitor 30 may be the one that uses a lenticular lens or that can individually see the left-eye image and the right-eye image by using special glasses such as polarized glasses and liquid crystal shutter glasses.

The zoom button 5 functions as zoom instruction means configured to instruct the zoom. The zoom button 5 includes tele button 5T that instructs the zoom to the telephoto side and wide button 5W that instructs the zoom to the wide angle side. When the stereoscopic image capture device 10 is in the imaging mode, if these tele button 5T and wide button 5W are operated, the focal distance of the imaging lens 12 changes. Moreover, if these tele button 5T and wide button 5W are operated at the time of the playback mode, a played image is expanded or reduced.

The cross button 6 denotes an operation unit to input instructions of four directions of upper, lower, right and left, and functions as a button (cursor movement operation means) that selects an item from a menu screen or instructs selection of various setting items from each menu. The right/left key functions as a frame advance (forward-direction/opposite-direction advance) button at the time of the playback mode.

The MENU/OK button 7 denotes an operation key having both a function as a menu button to give an instruction to display a menu on the screen of the 3D liquid crystal monitor 30 and a function as an OK button to instruct the fixation and execution of selection content or the like.

The playback button 8 denotes a button to switch to a playback mode to display a taken and recorded still image or moving image of a stereoscopic image (3D image) or plane image (2D image) on the 3D liquid crystal monitor 30.

The BACK button 9 functions as a button to instruct cancellation of input operation or return to the previous operational state.

[Configuration Examples of Imaging Optical System and Imaging Element]

The imaging lens 12 denotes an imaging optical system formed with many lenses including a focus lens and a zoom lens. A diaphragm 14 is formed with, for example, five diaphragm blades, and, for example, the diaphragm value (F value) is controlled from F2 to F8 in a continuous or phased manner. At the time of the imaging mode, image light indicating an object is formed on the light receiving surface of an imaging element 16 via the imaging lens 12 and the diaphragm 14.

FIGS. 3A to 3C are plan views illustrating the configuration example of the imaging element 16.

The imaging element 16 denotes a CCD (Charge Coupled Device) image sensor for detection of an image (phase difference) with a parallax. The imaging element 16 has pixels (main pixels which are also referred to as "A side pixels") of odd-numbered lines and pixels (sub-pixels which are also referred to as "B side pixels") of even-numbered lines, which are arranged in a matrix manner. Image signals of two regions subjected to photoelectric conversion in these main pixels and sub-pixels can be read independently.

As illustrated in FIG. 3B, in the odd-numbered lines (1, 3, 5, . . . ) of the imaging element 16, a line of pixel array of GRGR . . . and a line of pixel array of BGBG . . . are alternately provided among pixels having color filters of R (red), G (green) and B (blue). On the other hand, in the pixels of the even-numbered lines (2, 4, 6, . . . ), similar to the odd-numbered lines, a line of pixel array of GRGR . . . and a line of pixel array of BGBG . . . are alternately provided. The main pixels (the pixels of the odd-numbered lines) are arranged while being shifted by ½ pitches in the line direction with respect to the sub-pixels (the pixels of the even-numbered lines).

Figure 4A:
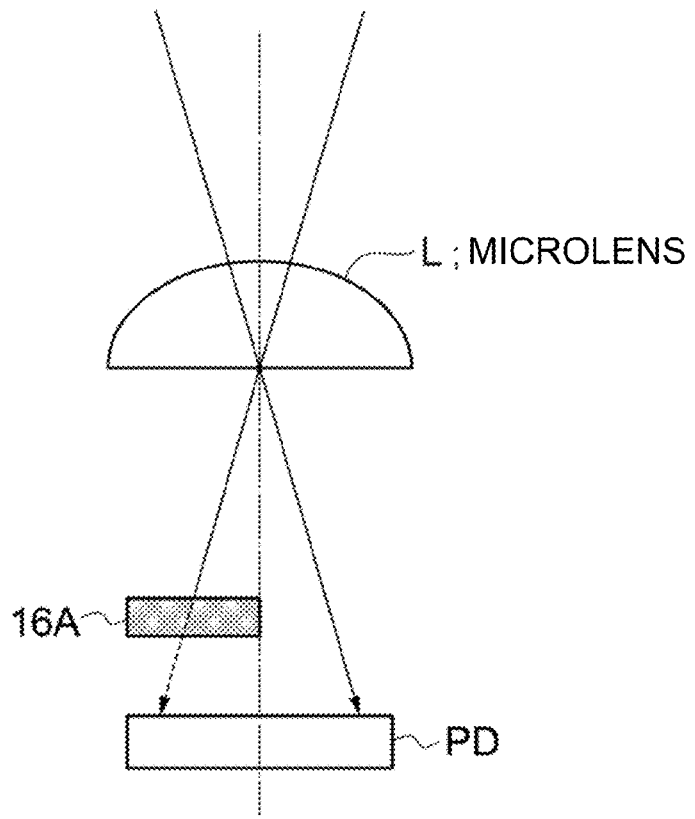
FIG. 4A is an enlarged main part view of the above-mentioned imaging element.
Figure 4B:
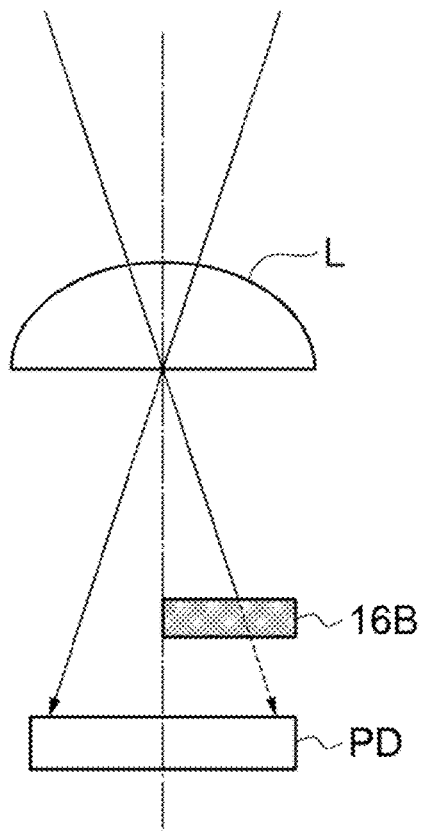
FIG. 4B is an enlarged main part view of the above-mentioned imaging element.

FIGS. 4A and 4B are enlarged main part views of the imaging element 16 that functions as a phase difference image sensor.

As illustrated in FIG. 4A, a light shielding member 16A is arranged on the front surface side (microlens L side) of photodiode PD of the main pixel of the imaging element 16. On the other hand, as illustrated in FIG. 4B, a light shielding member 16B is arranged on the front surface side of photodiode PD of the sub-pixel. Microlens L and the light shielding members 16A and 16B have a function as pupil division means. As illustrated in FIG. 4A, the light shielding member 16A shields the light in the left half of the light receiving surface of the main pixel (photodiode PD) in the figure. Therefore, the main pixel receives the light only on the left side of the light axis of a light flux that passes through an exit pupil of the imaging lens 12. Moreover, as illustrated in FIG. 4B, the light shielding member 16B shields the light in the right half of the light receiving side of the sub-pixel (photodiode PD). Therefore, the sub-pixel receives the light only on the right side of the light axis of a light flux that passes through the exit pupil of the imaging lens 12. Thus, the light flux that passes through the exit pupil is horizontally divided by microlens L as pupil division means and the light shielding members 16A and 16B, and entered into the main pixel and the sub-pixel, respectively.

Moreover, as for an object image corresponding to the left-half light flux and an object image corresponding to the right-half light flux in the light fluxes passing through the exit pupil of the imaging lens 12, although a focused part is formed in the same position on the imaging element 16, a front-focused or rear-focused part enters into a different position on the imaging element 16, respectively (the phase shifts). By this means, the object image corresponding to the left-half light flux and the object image corresponding to the right-half light flux can be acquired as parallax images (left-eye image and right-eye image) with different parallaxes. Here, although the imaging element 16 of this embodiment is a CCD image sensor, the presently disclosed subject matter is not limited to this. For example, an image sensor of the CMOS (Complementary Metal Oxide Semiconductor) type is possible.

[Internal Configuration of Stereoscopic Image Capture Device]

Figure 5:
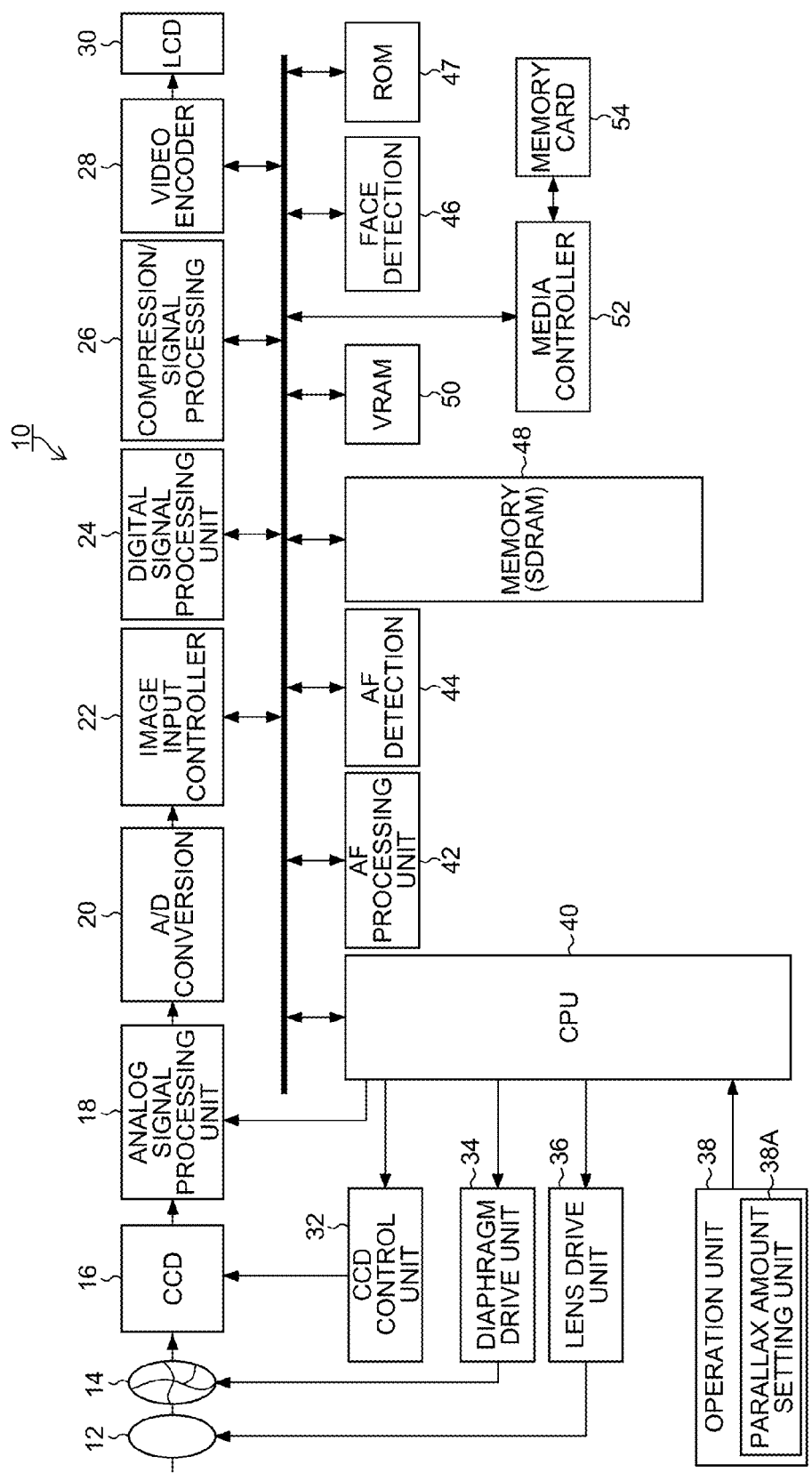
FIG. 5 is a block diagram illustrating an embodiment of an internal configuration of the above-mentioned stereoscopic image capture device.

FIG. 5 is a block diagram illustrating an embodiment of the internal configuration of the above-mentioned stereoscopic image capture device 10. This stereoscopic image capture device 10 records a taken image in a memory card 54, and the entire device operation is integrally controlled by a CPU (Central Processing Unit) 40.

An operation unit 38 is installed in the stereoscopic image capture device 10, where the operation unit 38 includes the shutter button 2 the power/mode switch 3, the mode dial 4, the zoom button 5, the cross button 6, the MENU/OK button 7, the playback button 8 and the BACK button 9. A signal from this operation unit 38 is input in the CPU 40, and the CPU 40 controls each circuit of the stereoscopic image capture device 10 on the basis of the input signal. For example, the CPU 40 performs lens drive control, diaphragm drive control, imaging operation control, image processing control, recording/playback control of image data and display control of the 3D liquid crystal monitor 30, and so on. A parallax amount setting unit 38A for the user setting of parallax correction is installed in the operation unit 38.

When the power source of the stereoscopic image capture device 10 is turned on by the power/mode switch 3, power is fed from a power unit which is not illustrated to each block, and the driving of the stereoscopic image capture device 10 is started.

A light flux that passed through the imaging lens 12 and the diaphragm 14 or the like is formed on the imaging element (CCD) 16, and a signal charge is accumulated in the imaging element 16. The signal charge accumulated in the imaging element 16 is read out as a voltage signal corresponding to the signal charge on the basis of a readout signal added from a timing generator (not illustrated). The voltage signal read out from the imaging element 16 is added to an analog signal processing unit 18.

The analog signal processing unit 18 performs correlation double sampling processing (processing to reduce the noise (especially, thermal noise) included in the output signal of the imaging element, that is, processing to acquire accurate pixel data by calculating the difference between the feed through component level and the pixel signal component level included in the output signal of each pixel of the imaging element) on the voltage signal output from the imaging element 16, such that the R, G and B signals of each pixel are sampling-held, amplified and thereafter added to the A/D converter 20. An A/D converter 20 converts the sequentially input R, G and B signals into digital R, G and B signals and outputs them to an image input controller 22.

A digital signal processing unit 24 performs predetermined signal processing such as offset processing, gain control processing including white balance correction and sensitivity correction, gamma correction processing, synchronization processing (demosaic processing), YC processing and edge emphasis or edge correction processing (edge part formation processing) on the digital image signals input through the image input controller 22.

Here, main image data read out from the main pixels of the odd-numbered lines of the imaging element 16 is processed as left-eye image data, and sub-image data read out from the sub-pixels of the even-numbered lines is processed as right-eye image data.

The left-eye image data and the right-eye image data (3D image data) processed in the digital signal processing unit 24 are input in a VRAM (Video Random Access Memory) 50. Region A and region B that record 3D image data indicating the 3D image of one frame are included in the VRAM 50. In the VRAM 50, the 3D image data indicating one the 3D image of one frame is alternately rewritten in regions A and B. The written 3D image data is read out from a region different from a region in which 3D image data is being rewritten, out of regions A and B of the VRAM 50.

The 3D image data read out from the VRAM 50 is encoded in a video encoder 28 and output to a 3D liquid crystal monitor (LCD) 30 provided on the back of the camera, and thereby the 3D object image is continuously displayed on the display screen of the 3D liquid crystal monitor 30.

When the first-stage press (half press) of the shutter button 2 of the operation unit 38 is performed, the CPU 40 starts AF operation and AE operation, moves the focus lens in the light axis direction through a lens drive unit 36 and controls the focus lens so as to be adjusted to a focusing position.

An AF processing unit 42 denotes a part that performs contrast AF processing or phase difference AF processing. In the case of performing the contrast AF processing, by extracting the high-frequency component of an image in a predetermined focus region of at least one image of the left-eye image and the right-eye image and integrating this high frequency component, the AF evaluation value indicating the focusing state is calculated. The CPU 40 moves the focus lens in the imaging lens 12 to a position in which this AF evaluation value becomes maximum. By this means, the AF control is performed. Moreover, in the case of performing the phase difference AF processing, the phase difference between images corresponding to the main pixel and the sub-pixel in a predetermined focus region of the left-eye image and the right-eye image is detected and the defocus amount is calculated on the basis of information indicating this phase difference. The AF control is performed by controlling the focus lens in the imaging lens 12 such that this defocus amount becomes zero.

The CPU 40 causes the zoom lens to perform forward and backward operation in the light axis direction through the lens drive unit 36 according to a zoom instruction from the zoom button 5, and changes the focal distance.

Moreover, the image data output from the A/D converter 20 at the time of the half press of the shutter button 2 is incorporated in an AE detection unit 44.

In the AE detection unit 44, G signals in the entire screen are integrated or G signals weighted differently between a central part and a peripheral part of a screen are integrated, and the integration value is output to the CPU 40. The CPU 40 calculates the brightness (imaging EV value) of the object from the integration value input from the AE detection unit 44, and, based on this imaging EV value, decides the F value of the diaphragm 14 and the shutter speed of an electronic shutter of the imaging element 16 according to a predetermined program diagram.

Here, in FIG. 5, "46" shows a known face detection circuit to detect person's face in an imaging angle of view and set an area including the face as an AF area and an AE area (for example, Japanese Patent Application Laid-Open No. 09-101579).

Moreover, "47" shows a ROM (EEPROM (Electronically Erasable and Programmable Read Only Memory)) that stores an image processing program to correct (parallax correction) the stereoscopic effect of the left-eye image and the right-eye image according to the presently disclosed subject matter, a calculation formula or look-up table for filter coefficient calculation, parameters of a calculation formula according to the parallax or the degree of parallax emphasis, or information to decide the look-up table, in addition to a camera control program, defect information of the imaging element 16 and various parameters and table used for image processing or the like. Also, the image processing program or the like according to the presently disclosed subject matter are described later in detail.

The AE operation and the AF operation end by the half press of the shutter button 2, and, when the second-stage press (full press) of the shutter button is performed, image data of two images of the left-viewpoint image (main image) and the right-viewpoint image (sub-image) corresponding to the main pixel and the sub-pixel output from the A/D converter 20 in response to that press is input from the image input controller 22 into a memory which is not illustrated (SDRAM (Synchronous Dynamic Random Access Memory)) and temporarily stored.

The image data of two images temporarily stored in the memory is arbitrarily read out by the digital signal processing unit 24. The digital signal processing unit 24 performs predetermined signal processing including synchronization processing (processing that interpolates the spatial gap of color signals due to the array of primary color filters and converts color signals in a synchronized manner), image processing of parallax correction and edge emphasis or edge correction according to the presently disclosed subject matter and YC processing (processing that converts R, G and B signals into luminance and color-difference signals and generates luminance data and color difference data). The image data subjected to the YC processing (YC data) is stored in the memory again.

The YC data of two images stored in the memory is output to a compression/decompression processing unit 26, and, after predetermined compression processing such as JPEG (Joint Photographic Experts Group) is executed, stored in the memory again. A multi-picture file (MP file or multi-image file: a file in a format in which a plurality of images are coupled) is generated from the YC data (compressed data) of two images stored in the memory. The MP file is recorded in the memory card 54 through a media controller 52.

Here, the stereoscopic image capture device 10 can acquire not only a stereoscopic image (3D image) but also a plane image (2D image).

[Parallax Correction and Edge Emphasis or Edge Correction]

Next, the principle of an image processing method of parallax correction and edge emphasis or edge correction according to an embodiment of the presently disclosed subject matter is described.

FIGS. 6A to 6D illustrate an example of detecting the corresponding points of the left-eye and right-eye images and emphasizing a parallax by performing filtering in which the phase is shifted according to the phase difference (parallax) of the corresponding points.

The rough flow is as follows. [1] The corresponding points of images are detected and a parallax is measured. [2] Phase shift image processing (filter) applied to the left-eye and right-eye images is set every local part. [3] Filtering is performed to shift the phase.

[1] The corresponding points of images are detected and the parallax is measured.

Figure 6C:
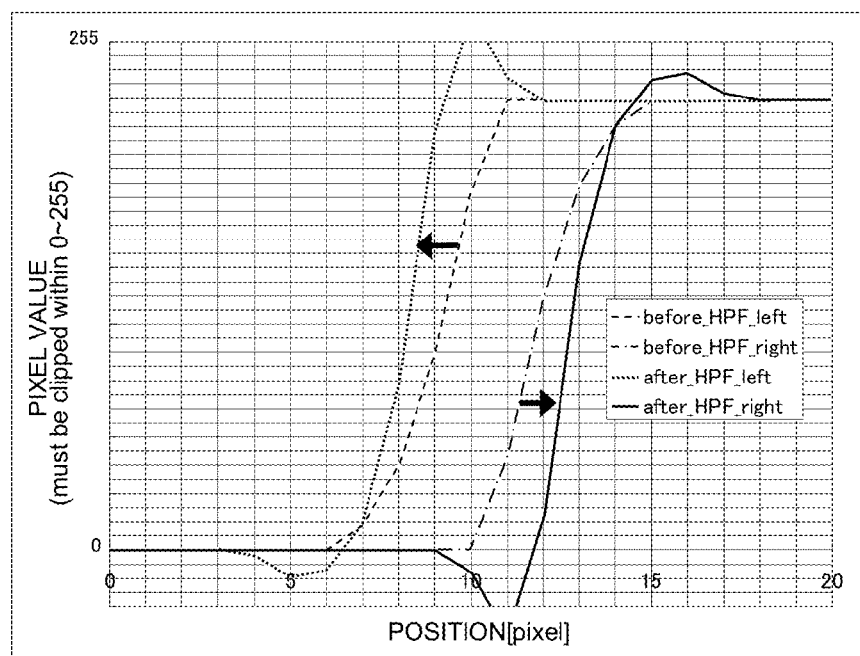
FIG. 6C is a graph illustrating a change in pixel value before and after filter processing.
Figure 6D:
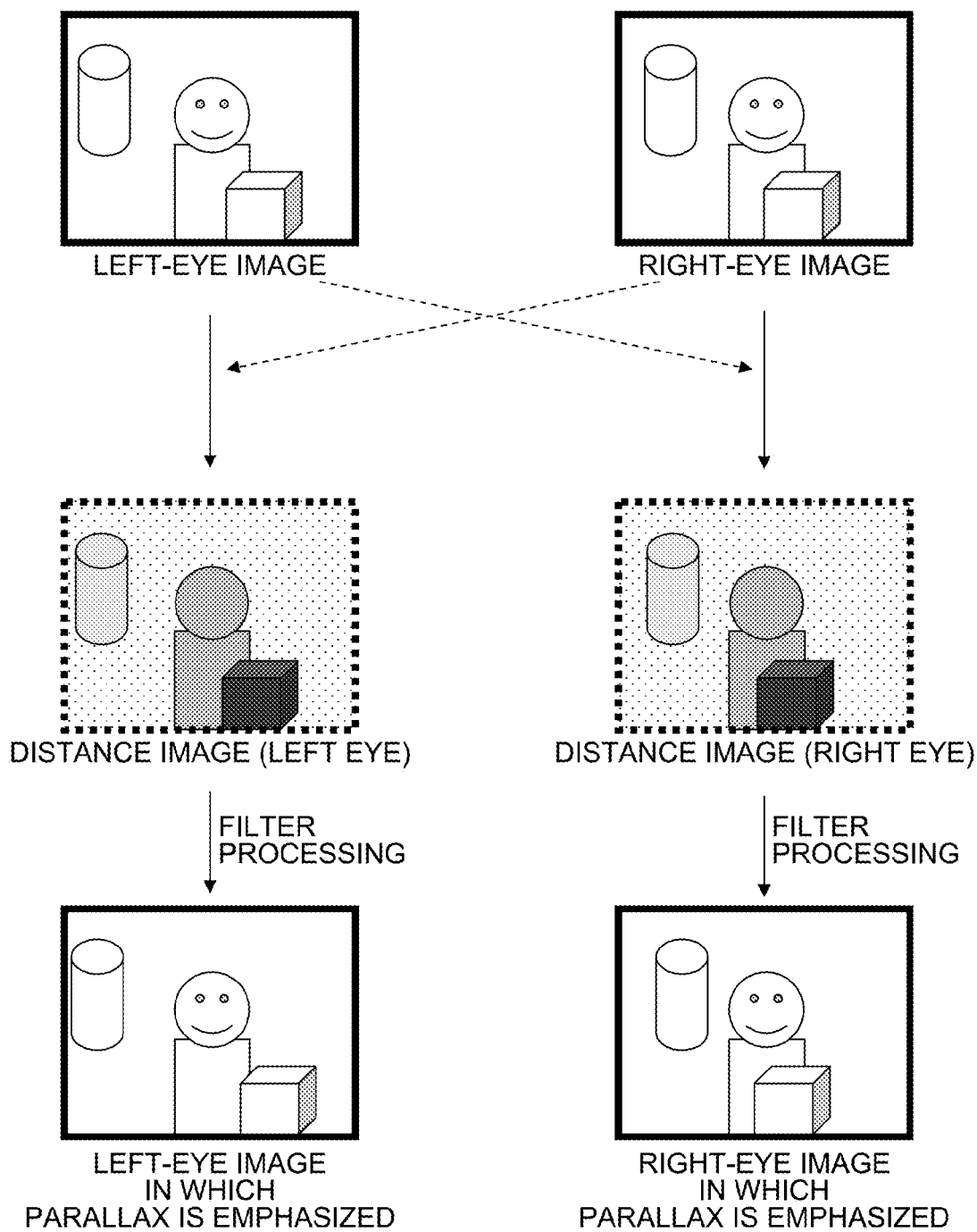
FIG. 6D is a view illustrating a flow of parallax correction.

As a method of detecting the corresponding points of right and left images, there is known a correlation method, and so on. For example, it can be performed by scanning a kernel of 15 pixels in the x direction and 1 pixel in the y direction and finding a part in which the square root of the difference in the pixel values is the smallest. The parallax measurement result can be expressed by a black and white image (distance image) that becomes brighter as it becomes more distant and that becomes darker as it becomes closer, as illustrated in FIG. 6D. The parallax measurement in units of sub-pixels is possible, and the detailed method is described in "Optimization of Correlation Function and Sub-Pixel Estimation Method on Block Matching (Information Processing Society of Japan Research Report, Vol. 2004, No. 40 (CVIM-144), Pages 33 to 40)" by Arai et al.

Here, there is generally the following problems in the parallax measurement.

Misdetection is likely to occur in a case where when the parallax is large.

As for a corresponding point between flat parts (in which the square root of the difference becomes small), it is difficult to detect the corresponding point.

However, in the monocular stereoscopic image capture device 10 including the single imaging lens 12 and the imaging element 16 for phase difference detection, the original parallax is extremely small. Therefore, the former false detection is less in general. Moreover, even in the later false detection, since it is originally a flat part, it can say that, even if corresponding point detection fails and the phase shifts, the eventual influence on image quality is less.

[2] Phase shift image processing (filter) applied to the left-eye and right-eye images is set every local part.

For example, in a certain part in the left-eye image, if it is desired to shift the phase only by one pixel, it only has to apply filter F ($F_L$, $F_R$) having a filter coefficient (image processing coefficient) in which the center of filtering is intentionally shifted by 1 pixel as illustrated in FIGS. 6A and 6B. Here, a number of the filter F as hardware may be one, and filter coefficients for respective images are set at the time of filter processing of the left-eye image or at the time of filter processing of the right-eye image. By this means, filter processing by filter $F_L$ or $F_R$ is sequentially performed.

Since this filter F is a direct-current component filter including a high-pass filter, it is possible to perform edge emphasis or edge correction and phase shift at the same time. Here, filters $F_L$ and $F_R$ illustrated in FIGS. 6A and 6B have a kernel size of 1×7 pixels (computation target pixel range). As for the filter coefficient of each of filters $F_L$ and $F_R$, the center of the filter coefficient mutually shifts from the kernel center in the opposite direction. In the examples illustrated in FIGS. 6A and 6B, the center of the filter coefficient of filter $F_L$ shifts by one pixel in the left direction and the center of the filter coefficient of filter $F_R$ shifts by one pixel in the right direction.

Figure 7:
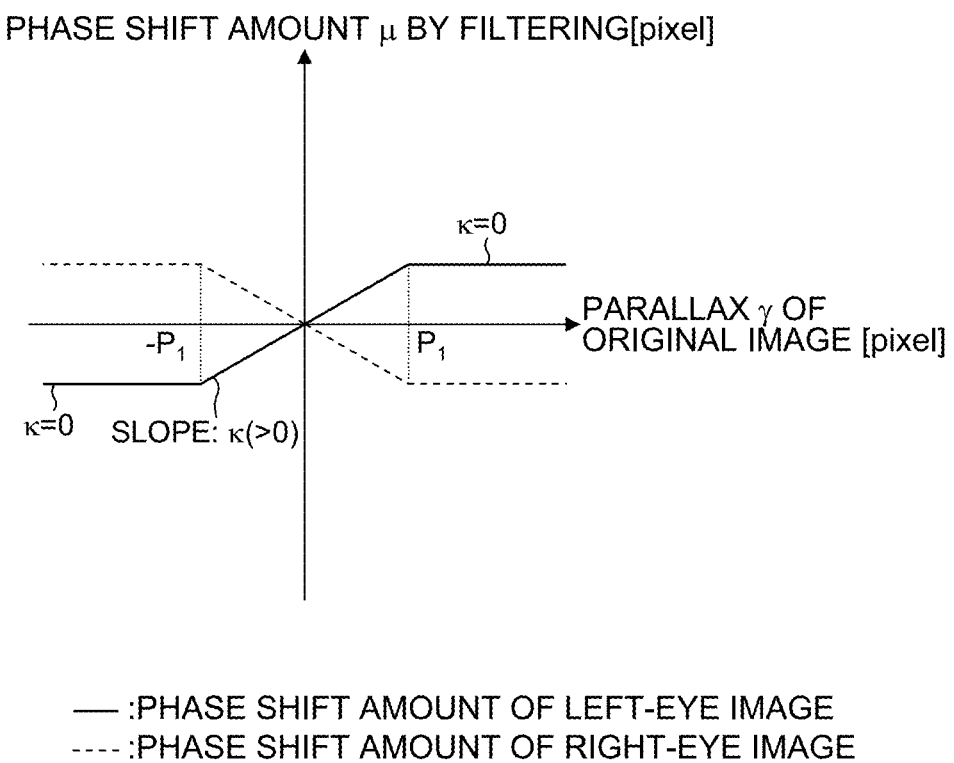
FIG. 7 is a graph illustrating a relationship between a parallax of an original image and a phase shift amount.

Phase shift amount μ by filters $F_L$ and $F_R$ may be decided by the input/output function as illustrated in FIG. 7. The sign of the present parallax [pixel] is provided as it is, and parallax γ within a predetermined pixel number range (±P1) is emphasized by applying slope κ(>0). As for parallax γ exceeding the predetermined pixel number range (±P1), phase shift amount μ is made constant such that slope κ (=0) is established. In preparation for a case where there is a mistake in the parallax measurement result, as for parallax γ exceeding a predetermined value ±P1 [pixel], slope κ is adjusted to 0 and the phase shift amount is made constant.

Here, the solid-line graph in FIG. 7 illustrates a phase shift amount with respect to the left-eye image, where the sign of the parallax amount of an object more distant than a focused object (parallax 0) is the plus and the sign of the parallax amount of an object nearer than the focused object is the minus. Moreover, the phase shift amount in the right direction is assumed to be the plus and the phase shift amount in the left direction is assumed to be the minus. Further, as illustrated by the dotted line in FIG. 7, the phase shift amount with respect to the right-eye image has a sign opposite to the phase shift amount with respect to the left-eye image.

[3] Filtering is performed to shift the phase.

Phase shift (including edge emphasis or edge correction) is performed by filter processing by filters $F_L$ and $F_R$. That is, a pixel group of 1×7 pixels with respect to the target pixel (mark pixel) for which corresponding point detection in the left-eye image is performed, and filter $F_L$ are subjected to convolution operation (filter processing). By this means, as illustrated in FIG. 6C, the mark pixel is subjected to edge emphasis or edge correction, and the phase is shifted by one pixel in the left direction. Similarly, when a pixel group of 1×7 pixels with respect to the mark pixel of the right-eye image corresponding to the mark pixel of the left-eye image and filter $F_R$ are subjected to convolution operation, the mark pixel is subjected to edge emphasis or edge correction, and the phase is shifted by one pixel in the right direction.

By this means, the mark pixel of the left-eye image and the mark pixel of the right-eye image corresponding thereto are subjected to edge emphasis or edge correction, the pixel position is enlarged by two pixels and the parallax is emphasized.

By performing filter processing on the left-eye image and the right-eye image by phase shift filters $F_L$ and $F_R$ as described above, it is possible to perform parallax emphasis with less failure and edge emphasis or edge correction at the same time.

[Edge Emphasis or Edge Correction and Phase Shift Filter]

The filter according to an embodiment of the presently disclosed subject matter performs parallax emphasis and edge emphasis or edge correction at the same time. Generally, the left-eye image and the right-eye image taken by a monocular 3D image capture device have a feature that a part with a larger parallax becomes more blurred. In the blurred part, there is a possibility that excessive edge emphasis or edge correction leads to an increase in noise.

Therefore, if the degree of edge emphasis or edge correction is weakened according to the parallax level, it is possible to reduce the noise in the blurred part and make a sharp part sharper.

For example, to correct the degree of edge emphasis or edge correction according to the parallax level, for example, the following method is possible.

First, filtering in which the frequency characteristic can be expressed by following [Equation 1] is considered.

$$SSD = \sum_i \sum_j \{f(i,j) - g(i,j)\}^2 \quad \text{[Equation 3]}$$

When the phase shift amount to be shifted is assumed as μ, the LPF component is assumed as Gaussian of standard deviation σ and above-mentioned [Equation 1] is subjected to Fourier transform, the filter coefficient is the following equation.

$$\begin{aligned}(\text{frequency characteristc of filter coefficient}) &= (\text{direct-current component}) + \alpha \times (HPF \text{ component}) \\ &= (\text{direct-current component}) + \alpha \times ((\text{direct-current component}) - (LPF \text{ component}))\end{aligned} \quad \text{[Equation 1]}$$

Figure 8A:
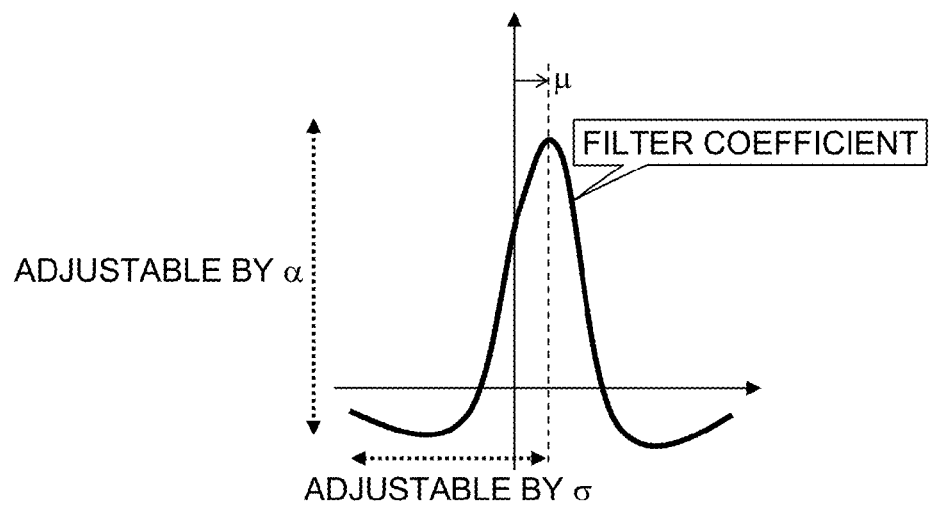
FIG. 8A is a graph typically illustrating a filter coefficient and a degree of edge emphasis or edge correction.
Figure 8B:
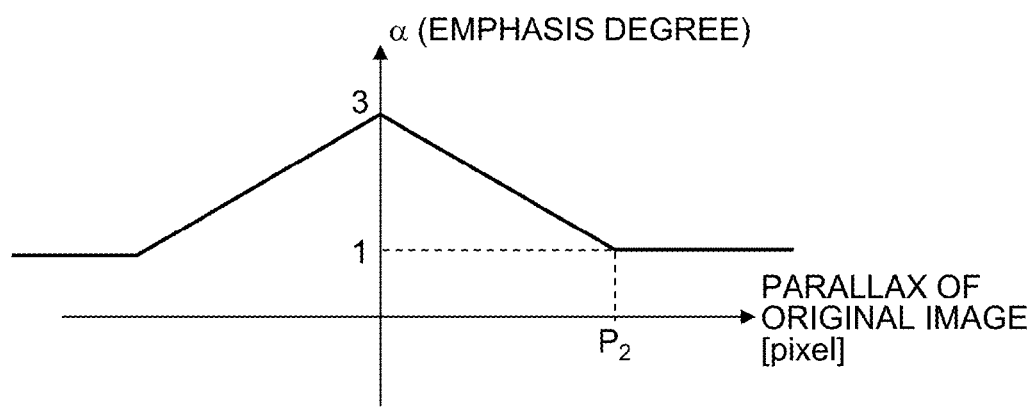
FIG. 8B is a graph typically illustrating the filter coefficient and the degree of edge emphasis or edge correction.

When the filter coefficient is typically expressed by a graph, it is as illustrated in FIG. 8A. It is possible to control the level of edge emphasis or edge correction to α and control the frequency band to be σ. By applying α to the parallax [pixel] function of the original image (for example, see FIG. 8B), it is possible to control the level of HPF according to the parallax.

As described above, by changing the degree of edge emphasis or edge correction according to the parallax level (blur degree), it is possible to reduce the noise in a blurred part and make a sharp part sharper.

[Embodiment of Image Processing Method]

Figure 9:
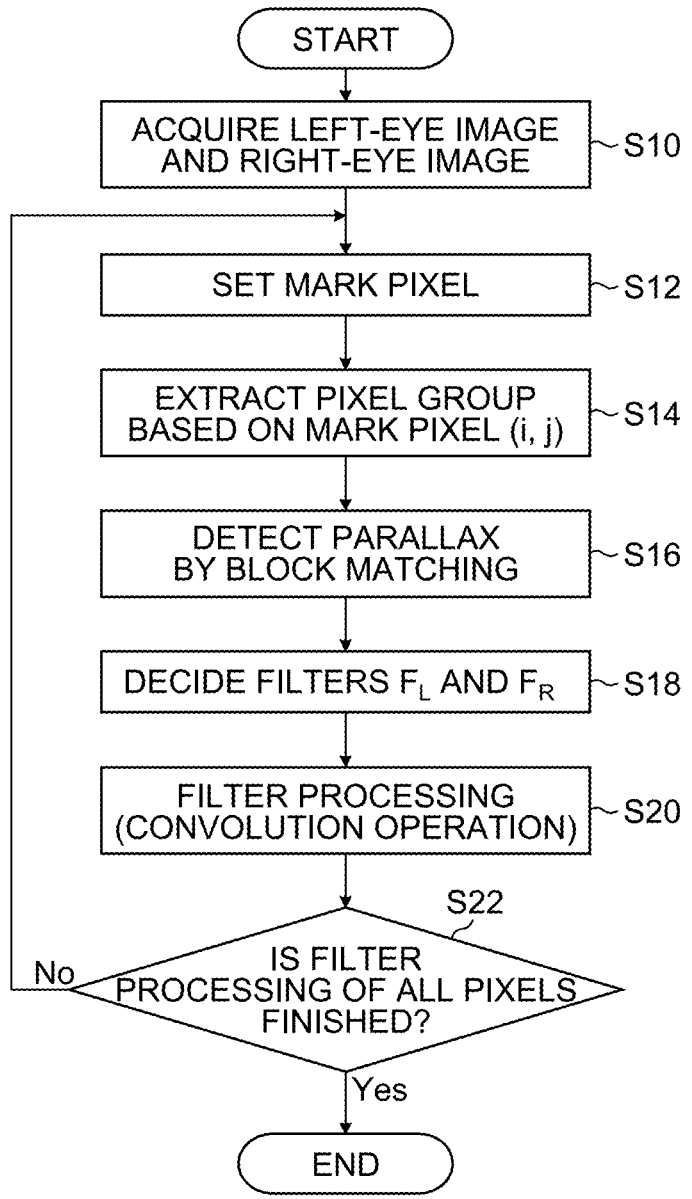
FIG. 9 is a flowchart illustrating an embodiment of an image processing method according to the presently disclosed subject matter.

FIG. 9 is a flowchart illustrating an embodiment of an image processing method according to the presently disclosed subject matter.

In FIG. 9, first, the left-eye image and the right-eye image before parallax correction are acquired (step S10). Subsequently, a processing target pixel (mark pixel (i, j)) of all pixels of the left-eye image is set (step S12). For example, in a case where the image size of the left-eye image is m×n pixels, the mark pixel is sequentially changed from pixel (1, 1) to pixel (m, n) and the following steps are repeated.

In step S14, pixel group A1 of predetermined block size [Cx×Cy] [pixel] based on mark pixel (i, j) set in step S12 is extracted.

In step S16, pixel group A2 with feature pixels matching that pixel group A1 is searched from the right-eye image on the basis of the extracted pixel group.

Figure 10A:
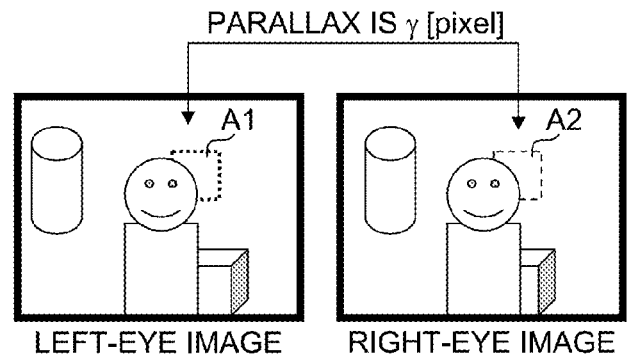
FIG. 10A is a view illustrating a state where filter processing is performed while performing parallax detection.

That is, as illustrated in FIG. 10A, the matching degree between pixel group (block) A1 extracted from the left-eye image and the block of the right-eye image is evaluated. A reference pixel of block A2 in the right-eye image when the matching degree between blocks is maximum is assumed as a pixel of a corresponding point of the right-eye image corresponding to the mark pixel of the left-eye image.

As a function that evaluates the matching degree between blocks in a block matching method (SSD block matching method), for example, there is the one that uses the square root of the luminance difference of pixels in each block (SSD).

In this SSD block matching method, computation of the following equation is performed for each of pixels f(i, j) and g(i, j) in the block of both images.

$$\text{(Filter coefficient)} = \delta(x-\mu) + \alpha\left(\delta(x-\mu) - \frac{1}{2\pi\sigma^2}e^{-\frac{(x-\mu)^2}{2\sigma^2}}\right)$$

$$= (1+\alpha)\delta(x-\mu) - \frac{\alpha}{\sqrt{2\pi\sigma^2}}e^{-\frac{(x-\mu)^2}{2\sigma^2}}$$

[Equation 2]

(Here, δ shows a delta function)

The computation of above-mentioned [Equation 3] is performed while moving the block position on the right-eye image within a predetermined search region, and a pixel in a position in the search region when the SSD value becomes minimum is assumed as a search target pixel.

Further, parallax γ indicating the pixel shift amount between the position of the mark pixel on the left-eye image and the searched corresponding pixel on the right-eye image is detected.

Subsequently, phase shift filters $F_L$ and $F_R$ corresponding to parallax γ are calculated (step S18). That is, as illustrated in FIG. 7, phase shift amount μ corresponding to the parallax γ is calculated and filter coefficients of filters $F_L$ and $F_R$ are calculated by above-mentioned [Equation 2] on the basis of this phase shift amount μ, standard deviation σ set in advance and intensity function α (see FIG. 8B) of edge emphasis or edge correction. Here, although the filter coefficients of filters $F_L$ and $F_R$ are calculated by calculation in [Equation 2] in this embodiment, the presently disclosed subject matter is not limited to this. For example, it may be possible to prepare a look-up table (LUT) storing a set of filter coefficients corresponding to parallax γ (or phase shift amount μ) or the like in advance, read out the corresponding filter coefficient set on the basis of parallax γ or the like and decide filters $F_L$ and $F_R$.

Figure 10B:
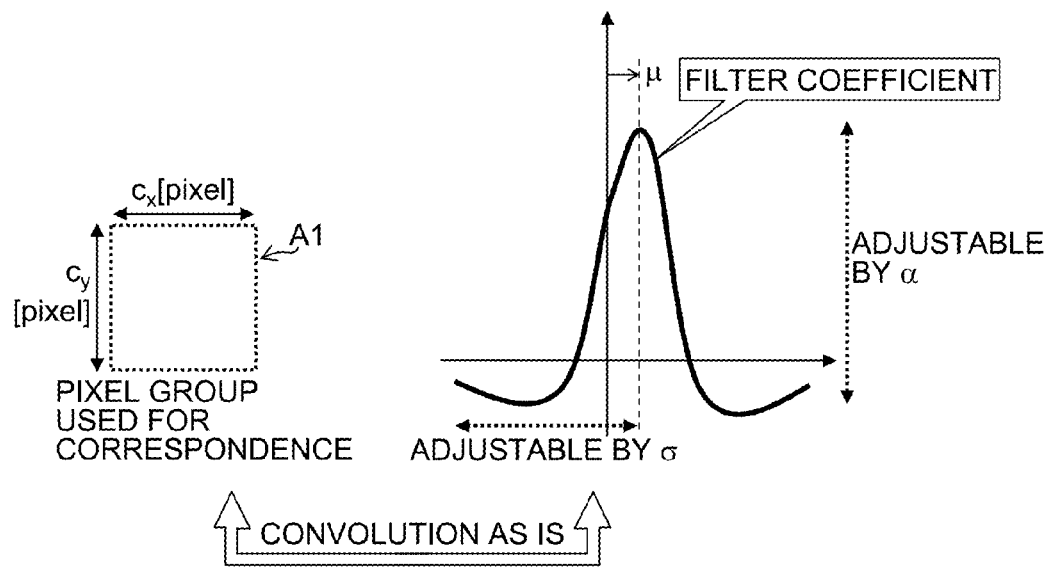
FIG. 10B is a view illustrating a state where filter processing is performed while performing parallax detection.

Subsequently, the pixel value of mark pixel (i, j) is calculated by performing convolution operation on a pixel group (block) extracted from the left-eye image on the basis of mark pixel (i, j) and filter $F_L$ of the same kernel size as this block size. Similarly, the pixel value of the corresponding point of the right-eye image is calculated by performing convolution operation on filter $F_R$ and a pixel group (block) based on the corresponding point of the right-eye image corresponding to mark pixel (i, j) which is detected by the block matching (step S20, FIG. 10B). Moreover, the pixel value of the mark pixel of the left-eye image after filter processing and the pixel value of the pixel of the corresponding point of the right-eye image after filter processing are arranged (mapping) on positions shifted only by phase shift amount γ from the original positions.

Here, for example, in a case where block size Cx×Cy is assumed as 7×7 pixels, the kernel size of filters $F_L$ and $F_R$ are set to 7×7 pixels as illustrated in FIGS. 11A and 11B.

Further, the image group (block) of the left-eye image and the pixel group (block) of the right-eye image, in which the corresponding point is detected and parallax γ is detected by the block matching method, are not released, and filter processing is performed by filters $F_L$ and $F_R$ as is. By this means, it is possible to reduce the memory utilization and speed up the processing.

Next, it is determined whether filter processing of all pixels of the left-eye image is finished (step S22). In a case where it is not finished (in the case of "No"), it proceeds to step S12, the mark pixel is moved and the processing in steps S12 to S22 is repeated. In a case where it is finished (in the case of "Yes"), the present image processing is finished.

[Another Embodiment of Phase Shift by Filtering]

Figure 12:
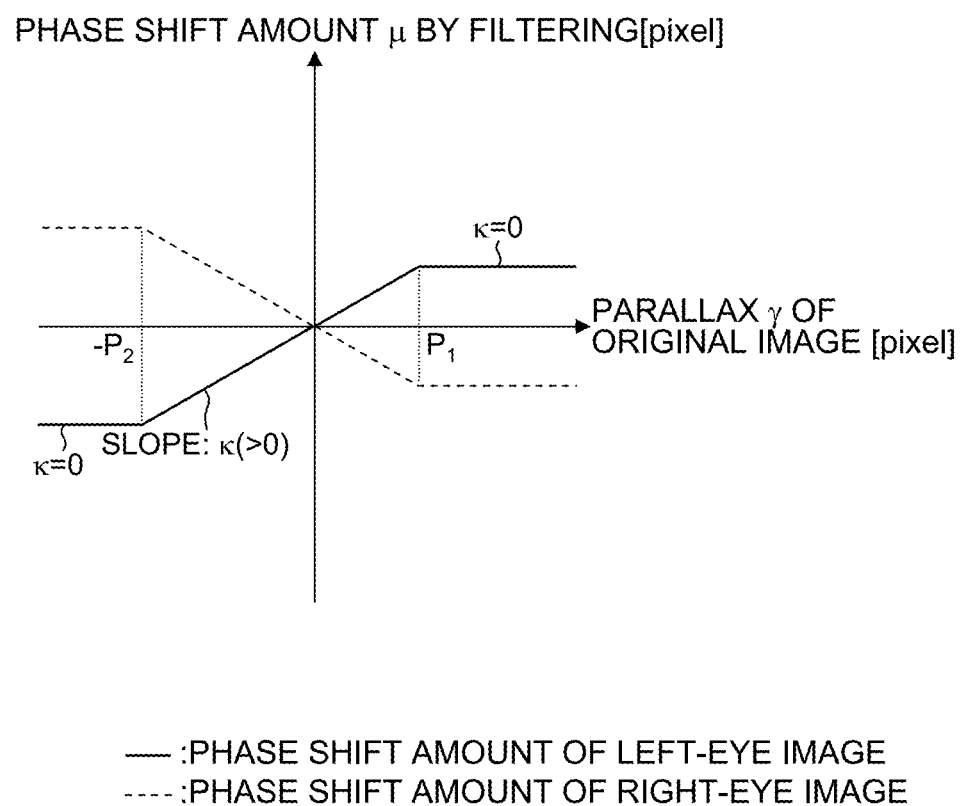
FIG. 12 is a graph illustrating a relationship between the parallax of the original image and the phase shift amount.
Figure 13:
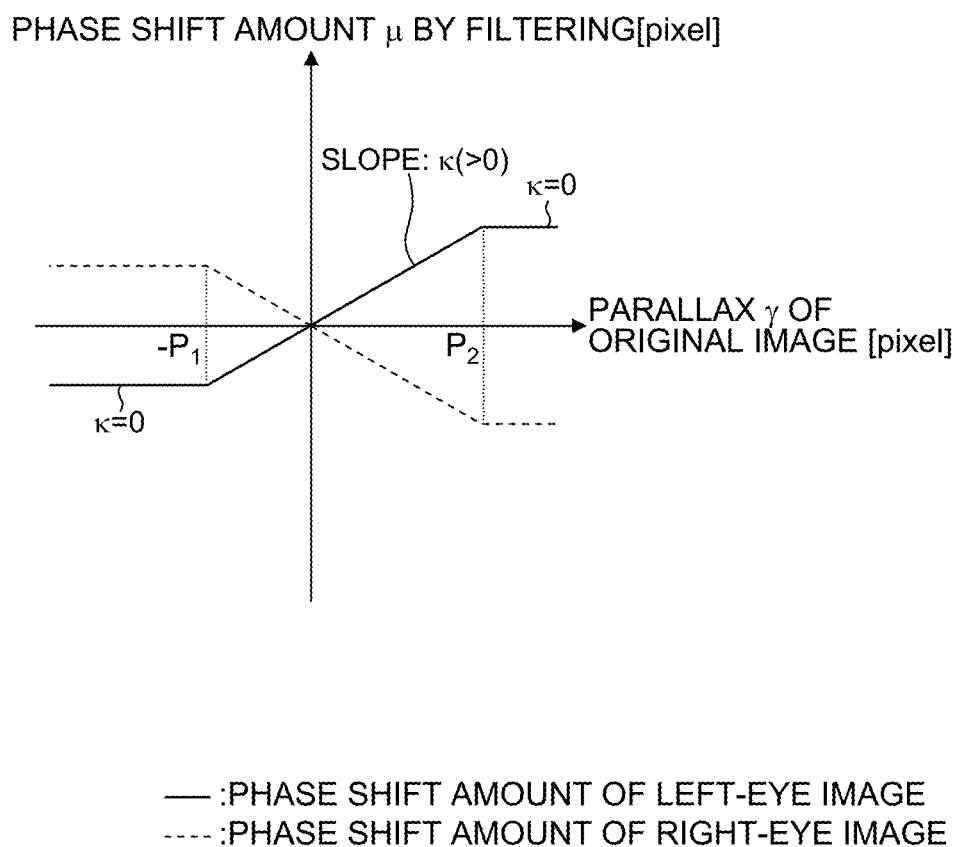
FIG. 13 is a graph illustrating the relationship between the parallax of the original image and the phase shift amount.
Figure 14:
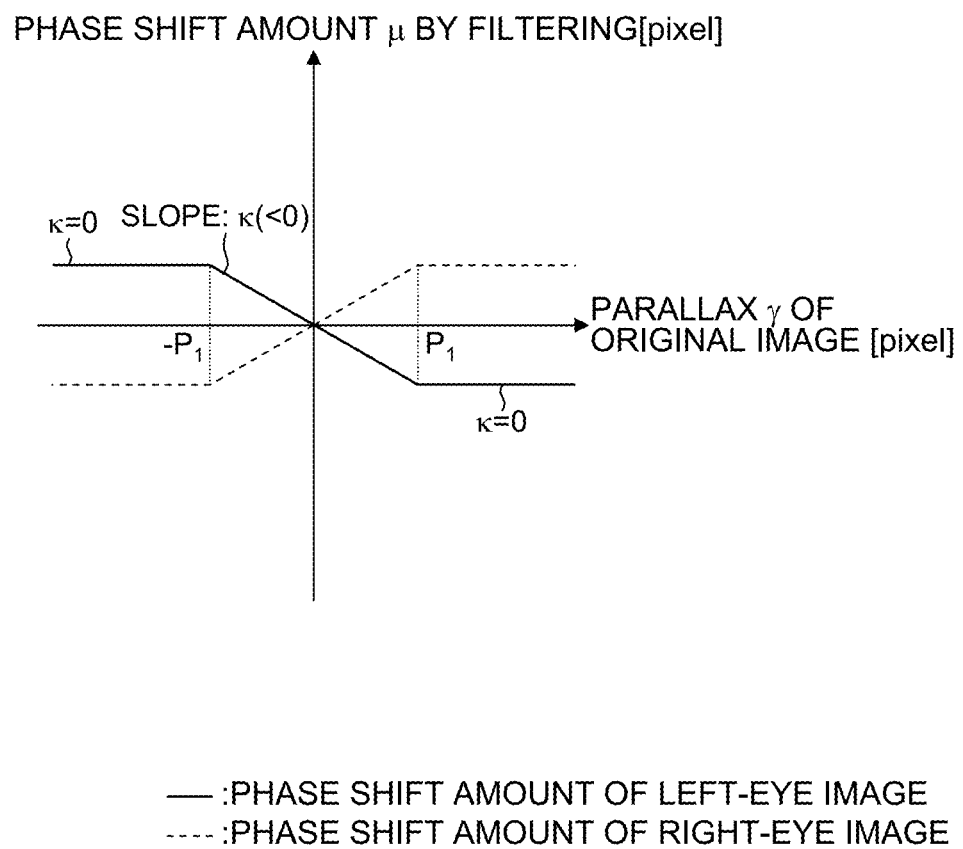
FIG. 14 is a graph illustrating the relationship between the parallax of the original image and the phase shift amount.

FIGS. 12 to 14 are graphs illustrating other embodiments of the relationship between each original image parallax and the phase shift amount (input/output function).

In the embodiment illustrated in FIG. 7, the degree of parallax emphasis is constant regardless of the sign of the parallax (the input/output graph is symmetrical with respect to a point). However, the degree of parallax emphasis may vary between the near side to the cross point (parallax 0) and the far side from the cross point, to emphasize the stereoscopic effect more.

In general, since a parallax is likely to be provided on the near side to the cross point as compared with the far side, it is considered to be effective that the parallax on the side on which the parallax is already provided is emphasized more greatly. To be more specific, it only has to prioritize the input/output function in a shorter distance than the cross point (negative phase shift).

For example, in a case where the parallax in a shorter distance than the cross point is emphasized in the left-eye image, since the sign of the phase shift amount is negative, a function in which the degree of emphasis on the negative side is greater than the degree of intensity on the positive side may be provided as illustrated by the solid line in FIG. 12. Similar to the right-eye image, the degree of parallax emphasis in the short distance is emphasized like the graph illustrated by the dotted line in FIG. 12.

Meanwhile, since, in the monocular 3D image, a parallax is less likely to be provided on the far side from the cross point as compared with the near side, the parallax on the far side on which the parallax is less likely to be provided may be emphasized. In this case, it only has to provide an input/output function as illustrated in the graph of FIG. 13.

In the above-mentioned embodiment, although a phase shift example has been described where the parallax of an original image is emphasized, for example, a case is considered where the parallax becomes too strong in a closer distance than the cross point at the time of macro photography.

In this case, there is provided an input/output function that performs phase shift so as to reduce the parallax of an original image as illustrated in the graph of FIG. 14. That is, although the parallax in a closer distance than the cross point is negative in the left-eye image, phase shift is performed on the positive side in the case of reducing this parallax.

Here, the phase shift amount to correct the parallax of an original image according to the level of the parallax is not limited to the above embodiment, and various input/output functions are possible like the case of nonlinear correction.

Moreover, it is preferable to prepare a plurality of functions or LUTs for parallax correction and select any of the functions or LUTs in a parallax amount setting unit 38A of the operation unit 38. According to this, the degree of correction of parallax intensity can be performed by the user setting.

[Image on which Parallax Correction is Performed]

An image on which the above-mentioned parallax correction is performed is, for example, each of synchronized (demosaiced) color images of RGB. Image processing to perform parallax correction performs the parallax correction on each of the color images of RGB by the use of same filters $F_L$ and $F_R$.

That is, although three color images of RGB are acquired as a left-eye image and right-eye image by synchronization processing in the digital signal processing unit 24, for example, parallax correction as illustrated in FIG. 9 is performed on the basis of the G image. Further, even for the R image and the B image, filter processing is performed using filters $F_L$ and $F_R$ that performed the parallax correction on the G image in the same pixel location.

By this means, even if a phase shift is performed by filter processing, each pixel of RGB moves by the same phase shift amount. Therefore, color shift is not generated.

Moreover, image processing to perform parallax correction may be performed on luminance data Y and color difference data Cr and Cb subjected to YC processing in the digital signal processing unit 24. Even in this case, for example, the parallax correction as illustrated in FIG. 9 is performed on the basis of luminance data Y, and filter processing is performed even on color difference data Cr and Cb using filters $F_L$ and $F_R$ that performed the parallax correction on luminance data Y in the same pixel position.

[Another Configuration Example of Imaging Element]

Figure 15:
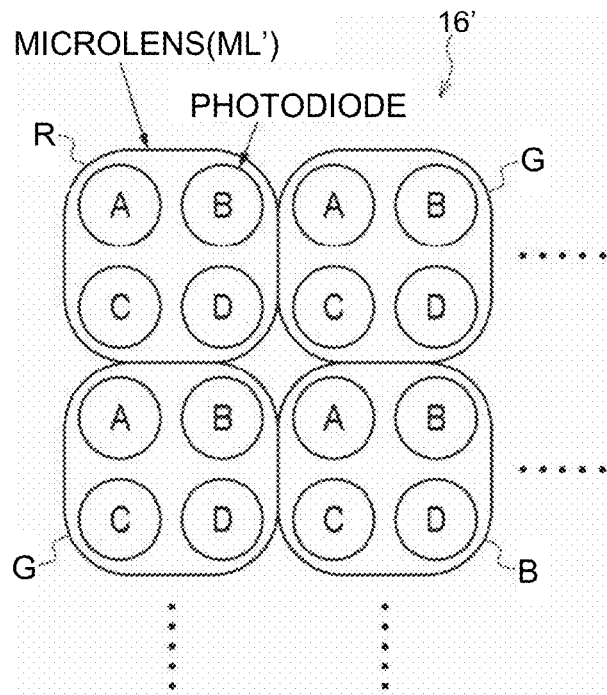
FIG. 15 is a plan view illustrating another composition example of an imaging element.

FIG. 15 is a view illustrating another configuration example of an imaging element 16'.

In the imaging element 16', four photodiodes A, B, C and D are bidimensionally arranged, one microlens ML' arranged so as to cover the four photodiodes is assumed as one unit (four pixel in one microlens) and this unit is bidimensionally arranged. Each photodiode in the unit can be read independently.

As illustrated in FIG. 15, in the odd-numbered lines (1, 3, 5 . . . ) of the imaging element 16', a line of pixel array of GRGR . . . is provided among pixels having color filters of R (red), G (green) and B (blue), while, in the pixels of the even-numbered lines (2, 4, 6 . . . ), a line of pixel array of BGBG . . . is provided.

Figure 16:
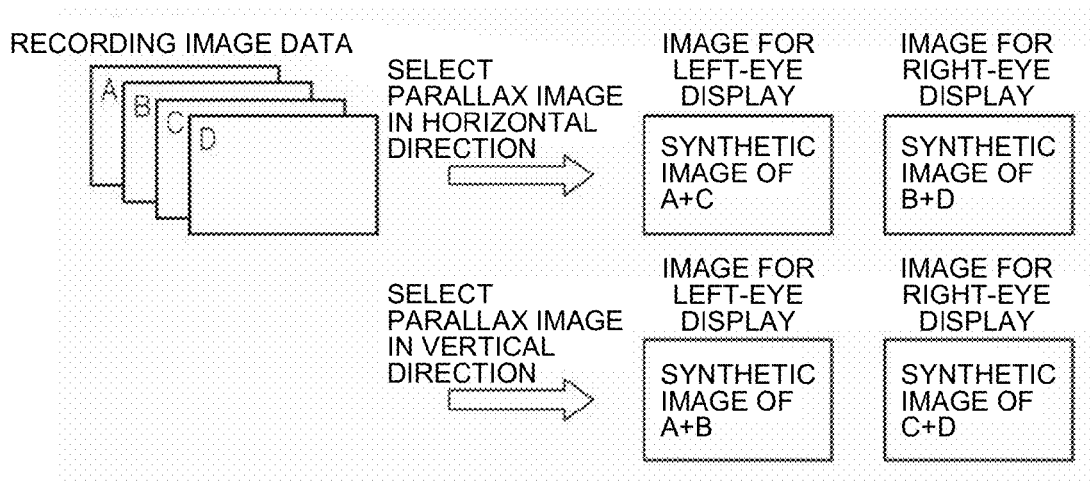
FIG. 16 is a view to describe a mechanism to take a stereoscopic image by the above-mentioned imaging element.

FIG. 16 is a view to describe a mechanism to take a stereoscopic image by the imaging element 16'.

In a case where the imaging element 16' is imaged in the horizontal direction (usual lateral imaging), the synthesis of photodiodes A and C of each unit is the main pixel in which only the left side of the light axis of a light flux passing through an exit pupil is received, and the synthetic image of photodiodes A and C is the left-eye image. Moreover, the synthesis of photodiodes B and D of each unit is the sub-pixel in which only the right side of the light axis of the light flux passing through the exit pupil is received, and the synthetic image of photodiodes B and D is the right-eye image.

In a case where the imaging element 16' is imaged in the vertical direction (so-called longitudinal imaging that rotates the stereoscopic image capture device 10 by 90 degrees and takes an image), the synthesis of photodiodes A and B of each unit is the main pixel in which only the left side of the light axis of a light flux passing through an exit pupil is received, and the synthetic image of photodiodes A and B is the left-eye image. Moreover, the synthesis of photodiodes C and D of each unit is the sub-pixel in which only the right side of the light axis of the light flux passing through the exit pupil is received, and the synthetic image of photodiodes C and D is the right-eye image.

[Others]

In this embodiment, although the phase of an edge position is shifted by filter processing using filter coefficients to perform edge emphasis or edge correction, the parallax may be corrected by extracting an edge from an image and shifting the attachment position of an edge signal according to the parallax.

Moreover, in the embodiment, although the monocular stereoscopic image capture device 10 has been described, the presently disclosed subject matter is applicable even to a binocular stereoscopic image capture device.

Further, the stereoscopic image capture device may record 3D RAW data on which image processing is not performed, and, when this 3D RAW data is subjected to RAW development by an external image processing device, perform parallax correction according to the presently disclosed subject matter. Similarly, the parallax correction may be performed using a personal computer in which an image processing program according to the presently disclosed subject matter is installed.

Moreover, the presently disclosed subject matter includes a camera phone having the above-mentioned stereoscopic image capture device, a personal digital assistant (PDA) and portable electronic devices such as a portable game device.

Moreover, the presently disclosed subject matter is applicable even to a printer including the above-mentioned image processing device, and this printer generates print data for stereoscopic view on the basis of a plurality of images subjected to parallax correction by the above-mentioned image processing device, and prints a photographic print for stereoscopic view on a lenticular lens sheet on the basis of the print data by a print engine.

Further, the presently disclosed subject matter is applicable even to a stereoscopic image player device including the above-mentioned image processing device, and this stereoscopic image player device displays an image for stereoscopic view on a 3D display on the basis of the first image and the second image processed by the image processing device.

Moreover, the presently disclosed subject matter can be provided as a program to cause a computer to execute the processing according to the above-mentioned embodiments and as a (non-transitory) recording medium storing the program.

Further, the presently disclosed subject matter is not limited to the above-mentioned embodiments, and it is needless to say that various changes can be made without departing from the spirit of the presently disclosed subject matter.

What is claimed is:

1. An image processing device comprising:
an image acquisition unit configured to acquire a first image and a second image with a parallax, which are taken as a stereoscopic image;
a parallax calculation unit configured to calculate a parallax indicating a shift amount of a corresponding pixel of the second image with respect to each pixel of the first image acquired by the image acquisition unit;
an image processing coefficient decision unit configured to decide an image processing coefficient to perform edge emphasis or edge correction with respect to every image processing target pixel of the first image and the second image acquired by the image acquisition unit, and decide the image processing coefficient for the target pixel based on the parallax calculated by the parallax calculation unit; and
an image processing unit configured to perform image processing using the image processing coefficient decided by the image processing coefficient decision unit for the first image and the second image acquired by the image acquisition unit,
wherein the image processing coefficient decision unit decides a filter coefficient as the image processing coefficient,
the image processing unit performs filter processing by a filter using the filter coefficient, and
the image processing coefficient decision unit decides a filter coefficient in which at least one of a degree of the edge emphasis or the edge correction and a frequency band varies according to the parallax,
wherein the image processing coefficient decision unit decides at least one of a filter coefficient that reduces the degree of the edge emphasis or the edge correction as the parallax increases and a filter coefficient that widens the frequency band as the parallax increases.

2. An image processing device comprising:
an image acquisition unit configured to acquire a first image and a second image with a parallax, which are taken as a stereoscopic image;
a parallax calculation unit configured to calculate a parallax indicating a shift amount of a corresponding pixel of the second image with respect to each pixel of the first image acquired by the image acquisition unit;
an image processing coefficient decision unit configured to decide an image processing coefficient to perform edge emphasis or edge correction with respect to every image processing target pixel of the first image and the second image acquired by the image acquisition unit, and decide the image processing coefficient for the target pixel based on the parallax calculated by the parallax calculation unit; and
an image processing unit configured to perform image processing using the image processing coefficient decided by the image processing coefficient decision unit for the first image and the second image acquired by the image acquisition unit,
wherein, when the parallax calculated by the parallax calculation unit is input for the target pixel, the image processing coefficient decision unit calculates a parallax shift amount according to a predetermined function for parallax correction or reads out a corresponding parallax shift amount from a predetermined look-up table for parallax correction, and
the image processing coefficient decision unit shifts the center of the image processing coefficient from the center of the computation target pixel according to the calculated or read parallax shift amount.

3. The image processing device according to claim 2, further comprising
a selection unit including a plurality of the predetermined functions or look-up tables for parallax correction, the selection unit configured to select any function or look-up table from the plurality of functions or the look-up tables by a user setting.

4. An image processing device comprising:
an image acquisition unit configured to acquire a first image and a second image with a parallax, which are taken as a stereoscopic image;
a parallax calculation unit configured to calculate a parallax indicating a shift amount of a corresponding pixel of the second image with respect to each pixel of the first image acquired by the image acquisition unit;
an image processing coefficient decision unit configured to decide an image processing coefficient to perform edge emphasis or edge correction with respect to every image processing target pixel of the first image and the second image acquired by the image acquisition unit, and decide the image processing coefficient for the target pixel based on the parallax calculated by the parallax calculation unit; and
an image processing unit configured to perform image processing using the image processing coefficient decided by the image processing coefficient decision unit for the first image and the second image acquired by the image acquisition unit,
wherein the parallax calculation unit detects a pixel on the second image corresponding to the target pixel of the first image by block matching between an image of a predetermined block size based on the target pixel of the first image and the second image, and
the parallax calculation unit calculates a parallax between the target pixel of the first image and the detected pixel on the second image, and
wherein:
the parallax calculation unit holds images of the predetermined block size in the first image and the second image used at a calculation of the parallax;
the image processing unit has a computation target pixel range of a same size as the predetermined block size; and
the image processing unit performs image processing using the images of the predetermined block size of the first image and the second image held by the parallax calculation unit and the image processing coefficient of the computation target pixel range.

5. A stereoscopic image capture device comprising
an image processing device comprising:
an image acquisition unit configured to acquire a first image and a second image with a parallax, which are taken as a stereoscopic image;
a parallax calculation unit configured to calculate a parallax indicating a shift amount of a corresponding pixel of the second image with respect to each pixel of the first image acquired by the image acquisition unit;

an image processing coefficient decision unit configured to decide an image processing coefficient to perform edge emphasis or edge correction with respect to every image processing target pixel of the first image and the second image acquired by the image acquisition unit, and decide the image processing coefficient for the target pixel based on the parallax calculated by the parallax calculation unit; and an image processing unit configured to perform image processing using the image processing coefficient decided by the image processing coefficient decision unit for the first image and the second image acquired by the image acquisition unit, wherein the image acquisition unit includes:

a single imaging optical system; and an imaging element in which object images passing through different regions of the imaging optical system are subjected to pupil division and formed, the imaging element configured to which acquire a first image and a second image with different parallaxes by performing photoelectric conversion on the object images passing through the different regions.

6. The stereoscopic image capture device according to claim 5, wherein the imaging element includes a first group pixel and a second group pixel for photoelectric conversion, which are arranged in a matrix manner in an entire surface of an exposure region of the imaging element, the first group pixel being restricted in a light receiving direction of a light flux so as to receive light of only an object image passing through a first region of the imaging optical system, and the second group image being restricted in a light receiving direction of a light flux so as to receive light of only an object image passing through a second region of the imaging optical system, and the imaging element can read out the first image and the second image from the first group pixel and the second group pixel.

7. A portable electronic apparatus comprising a stereoscopic image capture device, and an image processing device, the image processing device comprising:

an image acquisition unit configured to acquire a first image and a second image with a parallax, which are taken as a stereoscopic image;

a parallax calculation unit configured to calculate a parallax indicating a shift amount of a corresponding pixel of the second image with respect to each pixel of the first image acquired by the image acquisition unit;

an image processing coefficient decision unit configured to decide an image processing coefficient to perform edge emphasis or edge correction with respect to every image processing target pixel of the first image and the second image acquired by the image acquisition unit, and decide the image processing coefficient for the target pixel based on the parallax calculated by the parallax calculation unit; and an image processing unit configured to perform image processing using the image processing coefficient decided by the image processing coefficient decision unit for the first image and the second image acquired by the image acquisition unit, wherein the image acquisition unit includes:

a single imaging optical system; and an imaging element in which object images passing through different regions of the imaging optical system are subjected to pupil division and formed, the imaging element configured to which acquire a first image and a second image with different parallaxes by performing photoelectric conversion on the object images passing through the different regions.

8. A printer comprising:

a print unit configured to create a photographic print for stereoscopic view based on the first image and the second image processed by the image processing device, and an image processing device, the image processing device comprising:

an image acquisition unit configured to acquire a first image and a second image with a parallax, which are taken as a stereoscopic image;

a parallax calculation unit configured to calculate a parallax indicating a shift amount of a corresponding pixel of the second image with respect to each pixel of the first image acquired by the image acquisition unit;

an image processing coefficient decision unit configured to decide an image processing coefficient to perform edge emphasis or edge correction with respect to every image processing target pixel of the first image and the second image acquired by the image acquisition unit, and decide the image processing coefficient for the target pixel based on the parallax calculated by the parallax calculation unit; and an image processing unit configured to perform image processing using the image processing coefficient decided by the image processing coefficient decision unit for the first image and the second image acquired by the image acquisition unit, wherein the image processing coefficient decision unit decides the image processing coefficient such that a center of the image processing coefficient for the edge emphasis or the edge correction shifts from a center of a computation target pixel.

9. A stereoscopic image player device comprising:

an image display unit configured to display an image for stereoscopic view based on the first image and the second image processed by the image processing device, and an image processing device, the image processing device comprising:

an image acquisition unit configured to acquire a first image and a second image with a parallax, which are taken as a stereoscopic image;

a parallax calculation unit configured to calculate a parallax indicating a shift amount of a corresponding pixel of the second image with respect to each pixel of the first image acquired by the image acquisition unit;

an image processing coefficient decision unit configured to decide an image processing coefficient to perform edge emphasis or edge correction with respect to every image processing target pixel of the first image and the second image acquired by the image acquisition unit, and decide the image processing coefficient for the target pixel based on the parallax calculated by the parallax calculation unit; and an image processing unit configured to perform image processing using the image processing coefficient decided by the image processing coefficient decision unit for the first image and the second image acquired by the image acquisition unit, wherein the image processing coefficient decision unit decides the image processing coefficient such that a center of the image processing coefficient for the edge emphasis or the edge correction shifts from a center of a computation target pixel.

* * * * *